United States Patent [19]

Zinser

[11] Patent Number: 5,384,793
[45] Date of Patent: Jan. 24, 1995

[54] FADING AND RANDOM PATTERN ERROR PROTECTION METHOD FOR DYNAMIC BIT ALLOCATION SUB-BAND CODING

[75] Inventor: Richard L. Zinser, Schenectady, N.Y.

[73] Assignee: Ericsson GE Mobile Communications Inc., Lynchburg, Va.

[21] Appl. No.: 826,944

[22] Filed: Jan. 28, 1992

[51] Int. Cl.$^6$ .............................. H04L 1/08
[52] U.S. Cl. ................................ 371/69.1
[58] Field of Search ............ 371/69.1, 36, 67.1, 371/31; 381/31, 46

[56] References Cited

U.S. PATENT DOCUMENTS

| | | | |
|---|---|---|---|
| 4,054,863 | 10/1977 | Goodman et al. | 340/146.1 R |
| 4,156,867 | 5/1979 | Bench et al. | 340/146.1 |
| 4,291,405 | 9/1981 | Jayant et al. | 371/31 |
| 4,375,581 | 3/1983 | Jayant | 179/15.55 R |
| 4,516,258 | 5/1985 | Ching et al. | 381/31 |
| 4,538,234 | 8/1985 | Honda et al. | 364/513.5 |
| 4,549,296 | 10/1985 | Castel et al. | 371/16.5 |
| 4,622,680 | 11/1986 | Zinser | 375/25 |
| 4,670,880 | 6/1987 | Jitsukawa et al. | 371/69.1 |
| 4,688,224 | 8/1987 | Dal Degan et al. | 371/31 |
| 4,747,104 | 5/1988 | Piret | 371/39 |
| 4,802,171 | 1/1989 | Rasky | 371/43 |
| 4,831,624 | 5/1989 | McLaughlin et al. | 371/37 |
| 4,907,277 | 3/1990 | Callens et al. | 381/46 |
| 4,956,871 | 9/1990 | Swaminathan | 381/31 |
| 5,054,025 | 10/1991 | Galand et al. | 371/49.1 |

FOREIGN PATENT DOCUMENTS

| | | | |
|---|---|---|---|
| 58-298912 | 12/1983 | Japan . | |
| WOA8809967 | 12/1988 | WIPO | G06F 11/10 |
| WOA8810035 | 12/1988 | WIPO | H04B 14/06 |

Primary Examiner—Robert W. Beausoliel, Jr.
Assistant Examiner—Phung M. Chung
Attorney, Agent, or Firm—Nixon & Vanderhye

[57] ABSTRACT

A method for correcting random errors, and detecting and replacing fading errors in radio frequency (RF) digital transmissions, such as voice transmission. In a Dynamic Bit Allocation Sub-Band Coder (DBASBC), bits corresponding to sub-band energy levels are protected before transmission. In the received signal, errors in the protected bits are corrected at the bit level using a correction algorithm. Where this correction algorithm fails, the failure is detected and an estimated energy value is synthetically regenerated for the corrupted energy value.

10 Claims, 6 Drawing Sheets

FADING AND RANDOM PATTERN ERROR PROTECTION METHOD FOR DYNAMIC BIT ALLOCATION SUB-BAND CODING

FIELD OF THE INVENTION

This invention relates to coding, transmitting and detecting errors in a digital signal. In particular, the invention relates to bit error detection and correction in radio frequency (RF) transmissions of digital signals.

SUMMARY AND BACKGROUND OF THE INVENTION

This invention provides bit error detection and correction for a Dynamic Bit Allocation Sub Band Coder (DBASBC). DBASBCs are typically used for coding and digital transmission of speech signals. In a mobile radio environment, a digitally transmitted bit stream is subject to a variety of impairments. For example, fading pattern errors are induced by the vehicle's movement through direct and reflected wave patterns. Similarly, random pattern errors result from an overall weak received signal level.

Fading errors are manifested as quasi-periodic bursts of dense bit errors (10-50% of the received bits in error), and random errors are manifested as static occurrences of occasional errors (0-10% of the received bits in error). The invention disclosed here details a method for correcting random errors, and detecting and mitigating the effect of fading errors.

Sub-band coders operate by breaking the incoming digital signal up into separate frequency bands. These bands are usually identical in bandwidth, such as for a dynamic bit allocation coder, but may be of different widths. Splitting the input signal into bands is usually accomplished by digital filters, either arranged in parallel (1 filter per band) or in a tree structure (a cascaded binary tree of half-band split filters). The outputs of these filters are digitally decimated to reduce their effective sampling rate to the required Nyquist bandwidth before transmission, e.g., two times the filter bandwidth. The decimated sub-band signals are individually coded into bits for transmission. This coding usually takes the form of a scalar (1 dimensional) quantizer.

Sub-band coders achieve positive coding gains by allocating the quantization bits to the individual bands according to the energy level of the signal in that band. Coding gain is the gain in signal-to-noise ratio of a coding algorithm over the signal-to-noise ratio of a scalar quantizer operating at the same transmission (bit) rate. Since the spectrum of speech signals varies significantly over time, the allocation of quantization bits needs to be periodically updated. The combination of variable bit allocation with a sub-band coder is DBASBC. The period of time during which the bit allocation is valid is a frame. Encoding the sub-band coder parameters is performed on a frame-by-frame basis.

The energy level of each sub-band is also used in computing the correct scaling for the individual band quantizers' step sizes. Because two required pieces of information (the bit allocation and quantizer scaling) are contained in the energy levels, energy levels are transmitted to the receiver as side information. Both the receiver and transmitter use identical algorithms to extract the bit allocation information and quantizer scaling from these energy levels.

The bits used to code the sub-band energies are sensitive to error. A single, well-placed bit error in an energy level can cause the bit allocation algorithm in the receiver to mistrack. The result is an incorrect decoding of all the sub-band samples in the frame. Accordingly, energy bits are usually heavily protected to guard against such errors.

In a mobile radio environment, a digitally transmitted bit stream is subject to a variety of impairments. Specifically, these impairments can be divided into two major groups: fading pattern errors, induced by the vehicle's movement through direct and reflected wave patterns, and random pattern errors, which occur as a result of an overall weak received signal level. Fading errors are manifested as quasi-periodic bursts of dense bit errors (10-50% of the received bits in error), while random errors manifested as static occurrences of occasional errors (0-10% of the received bits in error).

Previous protection methods for digital transmissions treat the entire set of energy values as a single entity. For example, U.S. Pat. No. 4,831,624 does not show any error correction technique, but discloses a single cyclic redundancy code (CRC) checksum to detect differences in the bit allocation from transmitter to receiver. If the CRC detects a mismatch, the entire set of energy values from the previous frame is used in place of the values producing the erroneous bit allocation. While this algorithm works adequately for fading errors and produces a minimal level of overhead for protection, it has a serious failing when subjected to random pattern errors.

Using the method disclosed in U.S. Pat. No. 4,831,624, a single error in the significant energy bits causes the single CRC check to indicate a failure. Because of this, the probability that a frame will need to be replaced is many times greater than the probability of any one bit in the frame being in error. For example, if there are 20 bits that are sensitive, and the probability of a single bit error is 0.05 (i.e., 5% random pattern BER), then the probability of replacing the entire set of energies is about 0.64 or 64%. This will produce unintelligible garble at the SBC output, since only 36% of the receiver bit allocations will be correct. Accordingly, a more powerful algorithm is required to handle both random and fading pattern errors.

A novel strategy of protection of the DBASBC-encoded speech from bit errors is the object of this invention. The bits corresponding to the sub-band energy levels are the most perceptually significant bits, and thus are the only bits protected. Unlike the scheme disclosed in U.S. Pat. No. 4,831,624, the bits corresponding to each energy value are protected individually, with a separate error detection/correction decision for each energy. Thus, a single bit error will not cause replacement of the entire set of energies. This strategy is effective in both fading and random pattern bit errors.

In the preferred embodiment of the invention, the eight (8) sub-band energies are encoded with scalar non-uniform quantizers. Bands 1 through 6 are quantized with four (4) bits each, and bands 7 and 8 are quantized with three (3) bits each. The bands are numbered starting with the lowest frequency band (1) to the highest frequency band (8). The bits for each energy correspond to the index of the non-uniform quantizer's output level table. The indices are encoded with natural binary code and ordered with the increasing values of the output level table. The binary value "111" corresponds to the maximum quantizer output value of a 3 bit quantizer. The value "000" corresponds to the minimum level.

The bits for each energy level can be classified according to their position within the binary word. An error in the most significant bit (MSB) has a much larger effect on the output speech than an error in the least significant bit (LSB).

Energy information is protected by correcting correctable errors in the protected bits using a correction algorithm. When this correction algorithm fails, the failure is detected and an estimate is generated of the decoded energy. This estimate is a weighted-sum average of the values of the corresponding energy from the previous frame and the adjacent energies in the current frame. This detection and generation operation is synthetic regeneration.

Correction of errors is conducted at the bit level. Synthetic regeneration is at the decoded value level. Prior techniques did not correct at the bit level and regenerate at the energy level. For example, the schemes disclosed in U.S. Pat. Nos. 4,802,171 and 4,831,624 are applied at the bit level only and thereby limit the utility of the regeneration operation.

The two transmission protection strategies disclosed here can be understood as remedies for the two types of channel impairment present in mobile radio. Error correction of bits is most useful for improving DBASBC performance in random pattern errors. Error detection and synthetic regeneration is most useful in fading pattern errors.

Error correction of bits is generally not useful for fading pattern errors because error correction schemes break down when the bit error rate (BER) increases beyond a certain point. This break down point almost always occurs sometime during fading pattern errors. However, error detection schemes can be made robust enough to detect almost any error pattern including fading pattern errors. While correction and detection/regeneration schemes are both useful against either type of error pattern, correction plays a major role in the low BERs and detection/regeneration takes over in high BERs.

One of the novel features of the present technique is that the bit sequence representing each energy value is individually protected. If a single bit error occurs in the MSBs of the energy level, an error detection mechanism is activated for that single energy value. The individual energy value is corrected instead of replacing the entire set of energy values in the frame.

One advantage of the present technique is that there are fewer protected bits grouped together for the purpose of error detection as compared to grouping all bits representing all the energy values (typically 2 or 3 bits, instead of 20). This dramatically reduces the probability of replacing or regenerating the energy values. Another advantage is that if a single energy value is found uncorrectable, it is the only one replaced. The remaining energy values are left unperturbed. By combining the strategy for energy value protection with the error correcting algorithm, excellent performance against random and fading error patterns has been achieved.

BRIEF DESCRIPTION OF THE DRAWINGS

Reference will hereinafter be made to the accompanying drawings wherein like reference numerals throughout the various FIGURES denote like elements, and wherein.

DETAILED DESCRIPTION OF THE DRAWINGS

Figure 1:
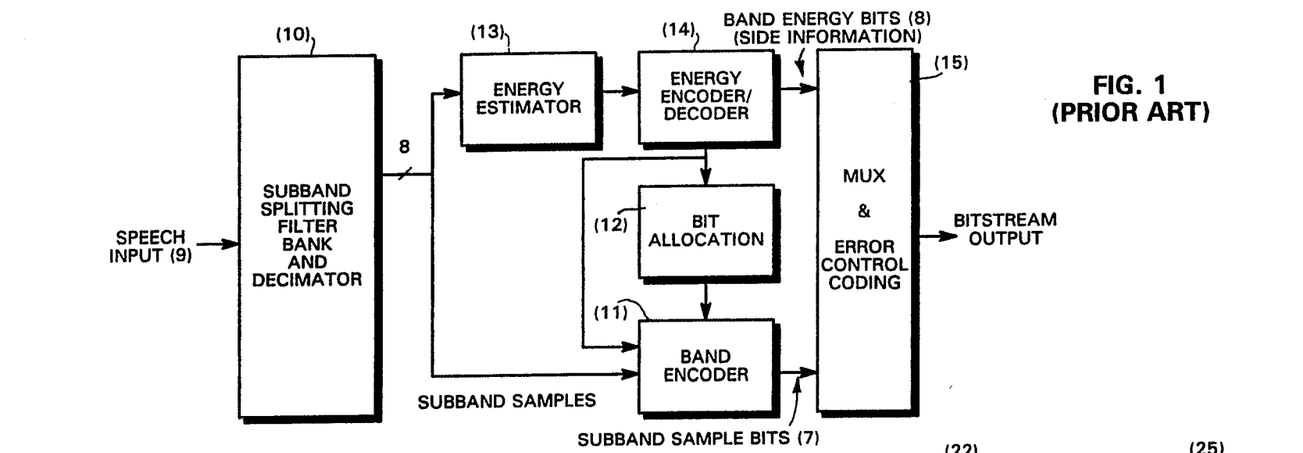
FIG. 1 is block diagram of a prior art DBASBC transmitter.
Figure 7:
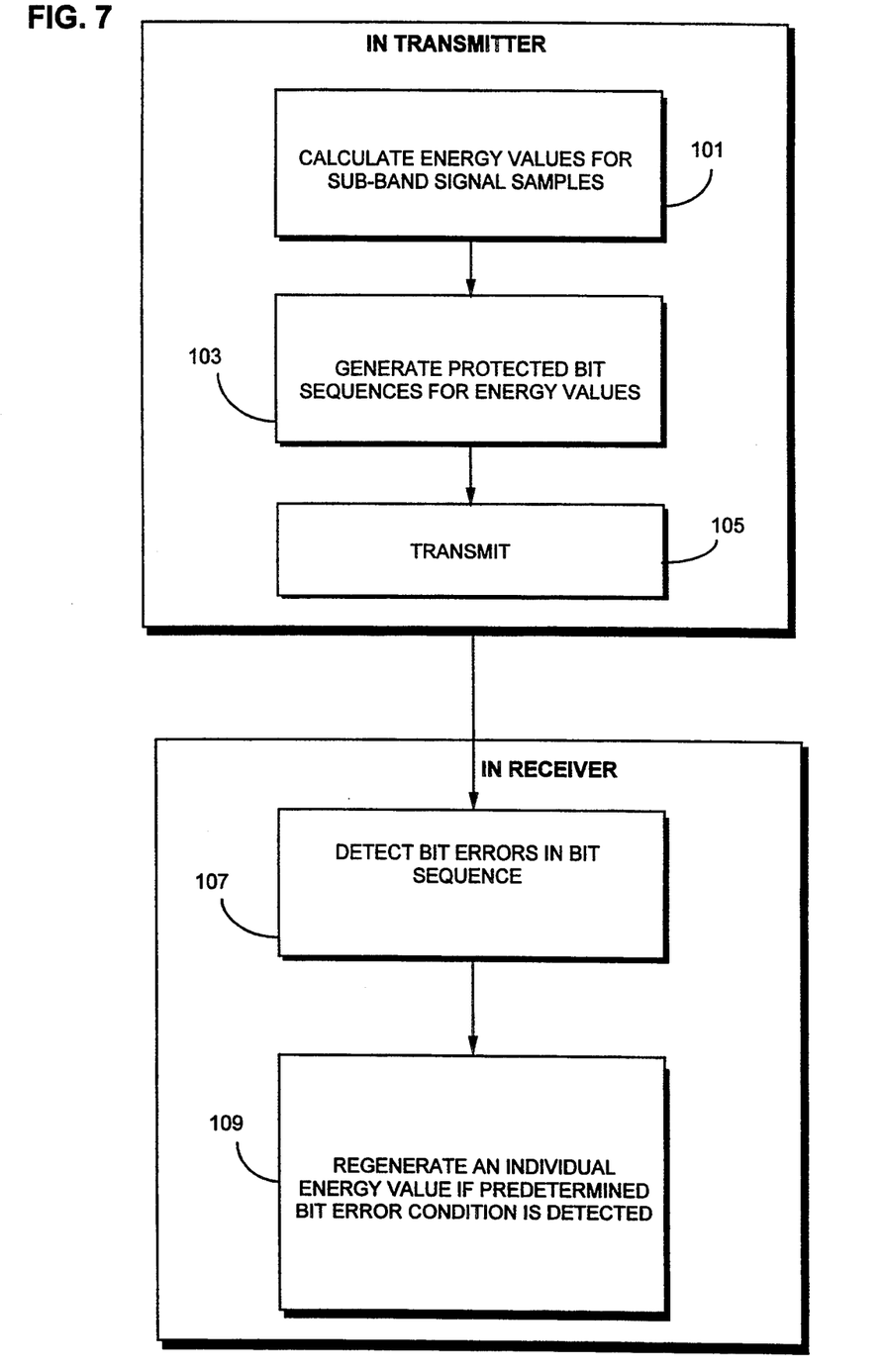
FIG. 7 is a flow chart illustrating a method of practicing one embodiment of the invention.

FIG. 1 shows a block diagram of a prior art DBASBC transmitter. FIG. 7 shows several of the steps for implementing an embodiment of the current invention using a DBASBC transmitter. FIG. 7 shows the incoming digital speech signal (9) is split into 8 equal-sized sub-bands by filter bank (10). The energy for each sub-band is calculated by the energy estimator (13) as shown in step (101). The energies are passed to the energy encoder/decoder (14) which generally consists of a set of scalar quantizers that are tailored to the long term statistics of each energy. Encoder (14) provides two output streams: the bits representing the energies to be sent (band energy bits 8) are directed to multiplexer (15) as shown in step (103), and the decoded values of the energies are provided to the bit allocation means (12) and to the band encoder (11).

The decoded values of the energy allow the DBASBC receiver and transmitter to track correctly. Bit allocation means (12) allocates the available bits to each band based on the decoded energy level. Band encoder (11) quantizes and encodes the sub-band signals (sub-band sample bits 7) according to the allocation received from allocation means (12) and computes the proper quantizer scaling from the decoded energy received from the energy encoder/decoder (14). The quantized sub-band samples and the encoded energy levels are combined in multiplexer (15) for transmission. Extra bits are added for error control coding in the multiplexer.

Figure 2:
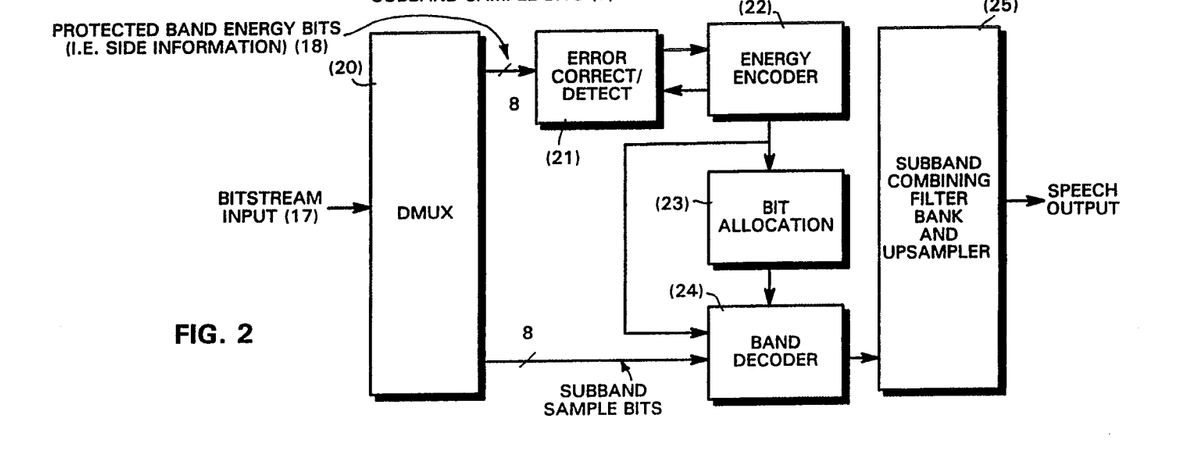
FIG. 2 is a block diagram of a DBASBC receiver.

FIG. 2 shows a block diagram of the DBASBC receiver. The receiver operation of a DBASBC system is the mirror image of the transmitter. Received bits (17) sent from the transmitter (step 105) are unpacked by demultiplexer (20) and separated into bits representing the sub-band energy (18) and sub-band samples (19). The bits associated with the sub-band energy are examined for errors by the error correction/detection means (21), step (107) of FIG. 7. The error correction means (21) is integrated with the energy decoder (22) to take advantage of the correlation between adjacent frames. Decoded energy values are passed back and forth between correction means (21) and decoder (22).

As in the transmitter, the bit allocation means (23) receives the energy from decoder (22), and sends the bit allocation on to the band decoder (24). Band decoder (24) uses the bit allocation and decoded energy from decoder (22) to decode the sub-band samples. The output speech is reconstructed by filter (25) from the decoded sub-band samples.

Figure 3:
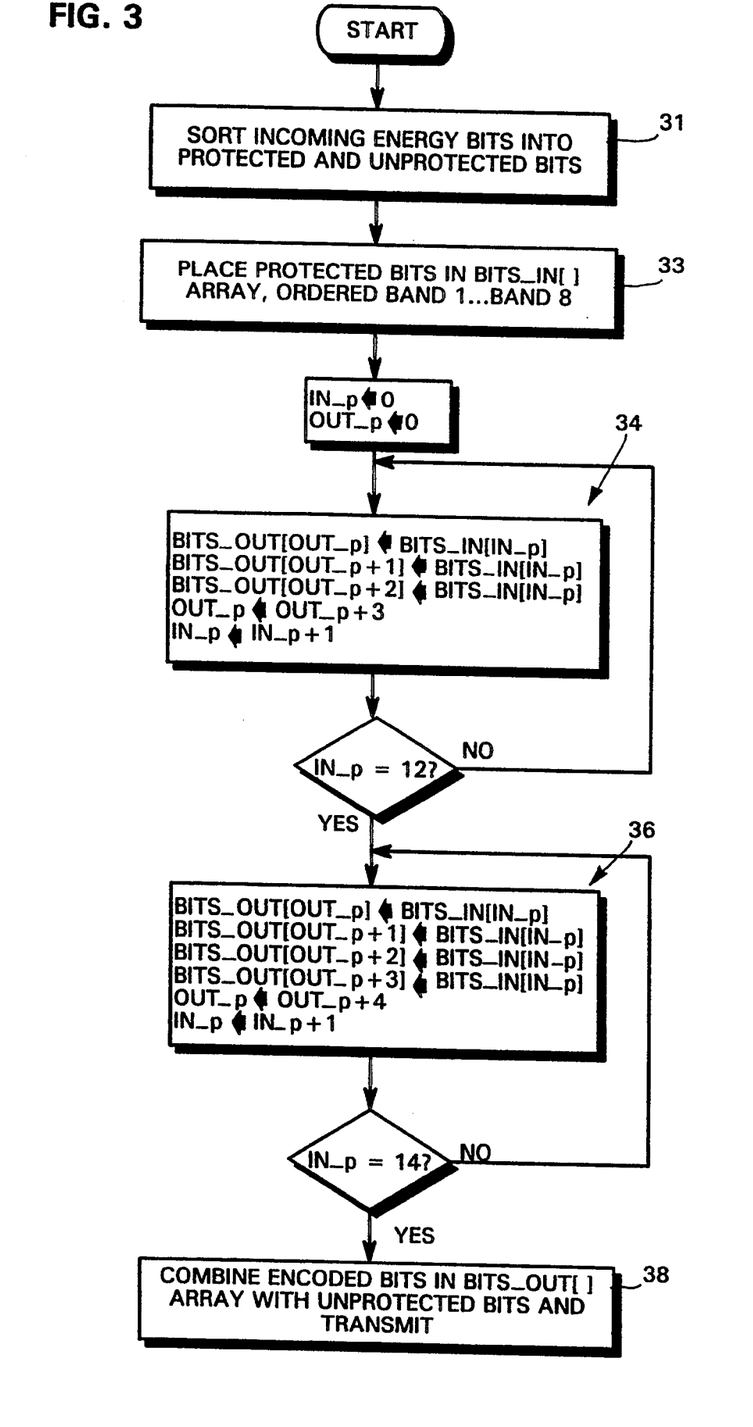
FIG. 3 a flowchart of the encoding algorithm.

FIG. 3 shows the flow of the encoding algorithm applied in the transmitter. In step 31, the incoming energy values are sorted into bits to be protected and bits not to be protected. The protected bits for each energy band are defined in Table 1 (step 33).

TABLE 1 the 2 MSBs of the energy of band 1
the 2 MSBs of the energy of band 2
the 2 MSBs of the energy of band 3
the 2 MSBs of the energy of band 4
the 2 MSBs of the energy of band 5
the 2 MSBs of the energy of band 6
the MSB of the energy of band 7
the MSB of the energy of band 8

As evident from Table 1, there are a total of fourteen protected bits.

In step 34, the two MSBs of each of the first six bands are encoded with "triple repetition" code. That is, each protected bit is repeated three times to produce three output bits. The MSB of band 7 and the MSB of band 8 are each encoded with a "quadruple repetition" code for which four identical output bits are generated for each input bit in step 36. The encoded bits are combined with the unprotected energy bits and transmitted as side information to the signal bit stream output in step 38.

The total overhead for the present encoding scheme is:

(2 protected bits/band)×(2 extra bits)×(6 bands)
+(3 extra bits)×(2 bands)=30 bits, The thirty (30) protection bits are significantly fewer than the fifty-six (56) bits required if eight 7-bit CRC checksums were applied.

Figure 4:
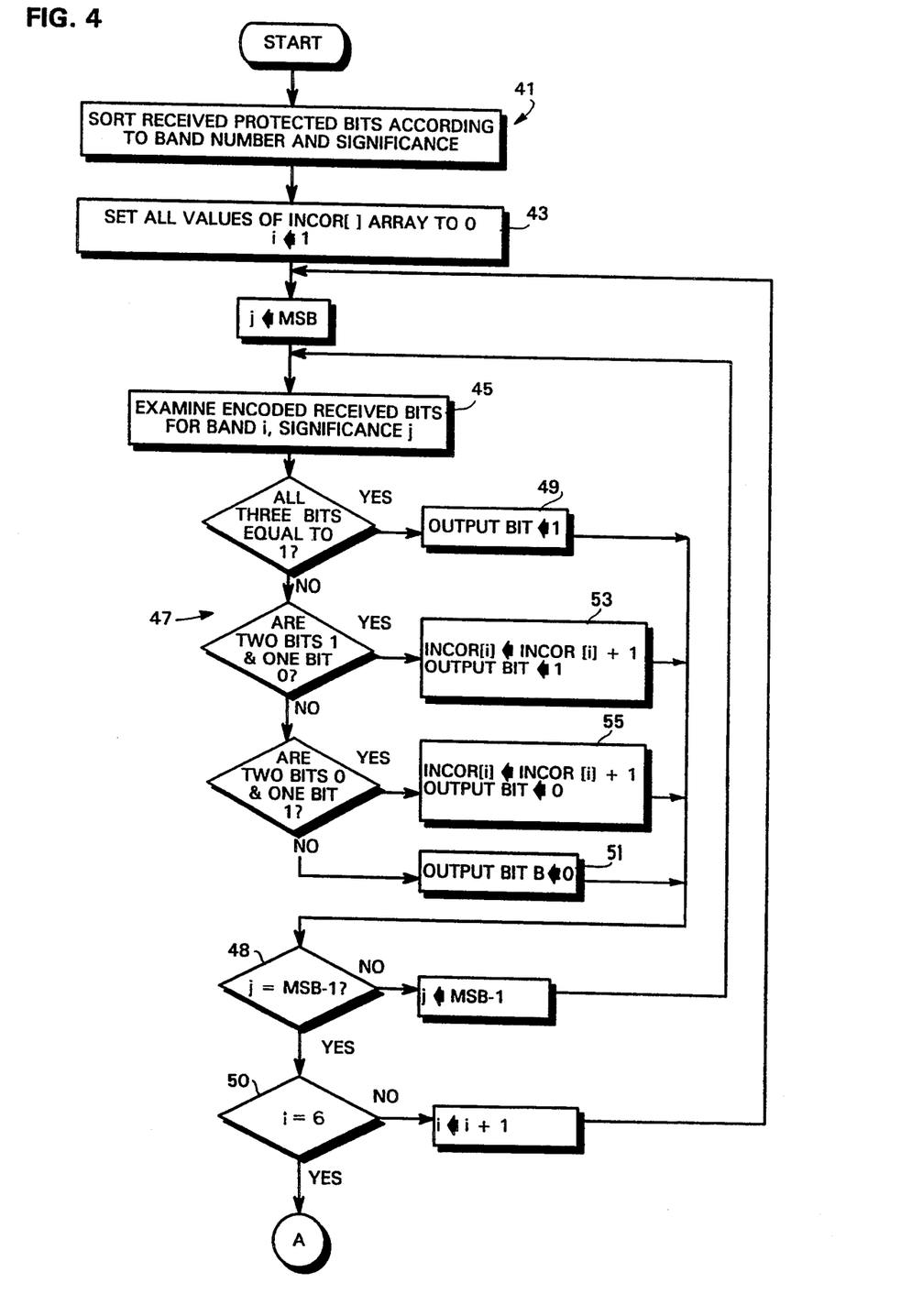
FIG. 4 is a flowchart of the first stage decoding algorithm (part 1)
Figure 5:
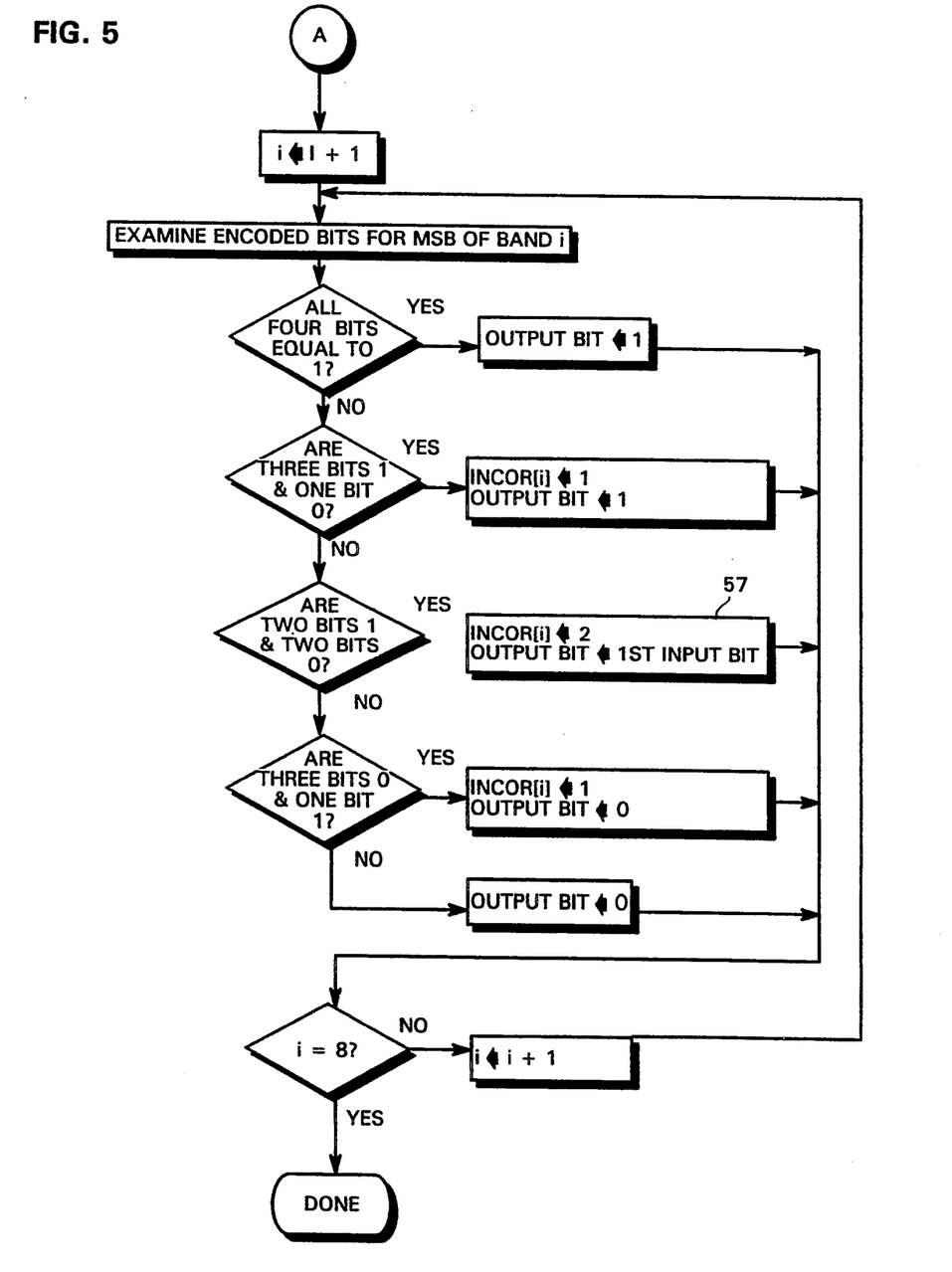
FIG. 5 is a flowchart of the first stage decoding algorithm (part 2)

As shown in FIGS. 4 and 5, the first stage of the decoding scheme applied in the receiver consists of bit error correction and the generation of confidence values. These two figures show the flow of the majority logic decoder for the protected bits. FIG. 4 shows the decoding operation for bands 1 through 6. FIG. 5 is similar to FIG. 4, but shows the decoding for bands 7 and 8.

In step 41, the received energies are sorted by band number and bit significance. An array (incor) for counting questionable protected bits is set to zero in step 43.

The output bits for the MSBs of each energy value are selected by a simple majority vote over the redundant protected input bits. Accordingly, in step 45 the three bits for each protected bit are voted to select a particular output bit in step 47. This vote is repeated for each protected bit in each energy band in loops 48 and 50. A similar voting algorithm is shown in FIG. 5.

In addition to selecting output bits, the decoding algorithm produces a confidence score for each energy and this score is tallied in the array incor[]. The confidence score represents the likelihood that the voted output bits actually represent the energy value that was transmitted. The confidence score takes on three values: 0, which implies high confidence in the output value; 1, which implies that the output may be in question; and 2, which implies that the output is probably incorrect. A high confidence value (0) results when only steps 49 and 51 occur in loop 48. A questionable confidence value (1) results when either steps 53 or 55 occur in addition to either step 49 or 51 in loop 48. An incorrect indicator (2) results when steps 53 or 55 occur twice in loop 48, or step 57 occurs.

For example, if the values of the incor[] array are 2,0,1,0,0,1,0,0, for incor[1] through incor[8], respectively, then the interpretation would be that the energy for band 1 is most likely incorrect, the energies for bands 3 and 6 could be incorrect, and the remaining energies (for bands 2, 4, 5, 7 and 8) are probably correct. These confidence scores are used in determining which, if any, energy values (not just bits) are to be replaced.

Figure 6:
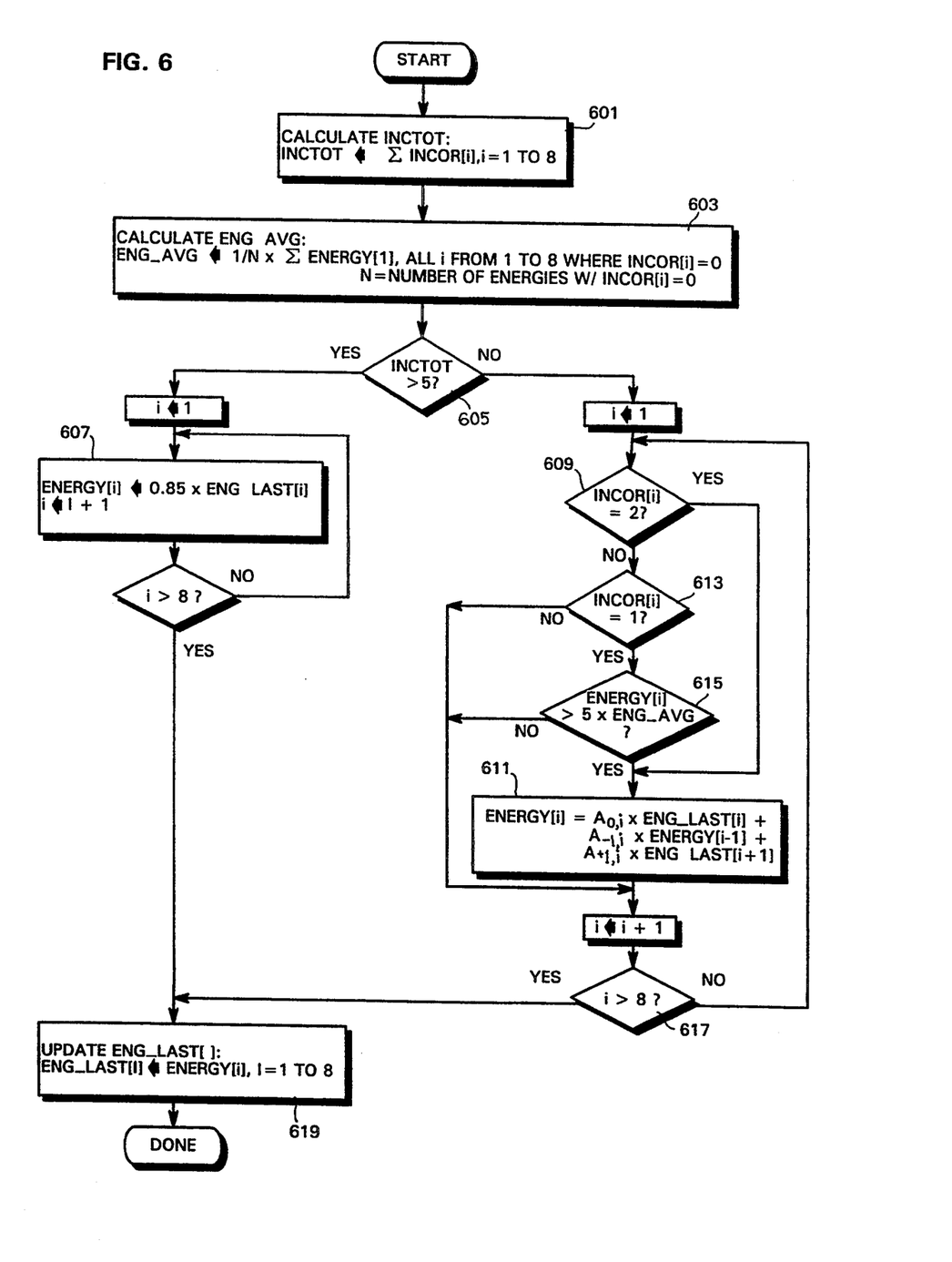
FIG. 6 is a flowchart of the second stage decoding algorithm.

As shown in FIG. 6, the second stage of the decoding algorithm consists of interpreting the confidence scores contained in the incor[] array and applying the appropriate corrective action to regenerate the energy values when required. Before this algorithm can be applied, the energy values must be decoded from the bits produced from the first stage, and placed in an eight dimensional array called "energy[]". This decoding is performed by the standard technique of looking up the output value in the quantizer level table from the index formed by the bits corresponding to each energy.

Initially, it is determined if a fade has corrupted the entire set of the energy values. This is accomplished by totaling the array of confidence scores (incor[]) and placing the result in scalar variable "inctot", steps 601. If the value of inctot exceeds five (step 605), the entire frame is deemed corrupted, and all the energy values are replaced with 0.85 times the corresponding values from the last frame. The values from the last frame are contained in the array eng_last[], step 607. The scaling factor of 0.85 was chosen because it approximates the long term normalized cross-correlation between time-adjacent frames of energy data. Use of the normalized cross-correlation is optimal in the minimum mean-square error sense.

If the value of inctot is less than or equal to five, then the energy values and confidence scores are examined individually. For each incor[] and energy[] value, the following rules are applied for regenerating an individual coefficient: 1) if the value of incor[] is 0, then the corresponding energy value is left alone; 2) if the value of incor[] is 2, then the corresponding energy value is regenerated unconditionally (steps 609 and 611); and, 3) if the value of incor[] is 1 (step 613), then the corresponding energy value is regenerated (step 611) if it exceeds five (5) times the average non-corrupted energy value (step 615).

The average non-corrupted energy value (step 603) is defined by:

$$\text{eng\_avg} = \frac{1}{N} \sum_{i=1}^{8} \text{energy}[i] \text{ for all } i$$

where incore[i]=0
where N=the number of energies having incor[i]=0

The process for regenerating individual energy values is slightly different from the one used when the entire frame of energies is replaced. (See step 109 in FIG. 7) In step 611, a weighted sum of the corresponding energy value in the previous frame and the two adjacent energy values in the current frame are used to generate a replacement value. This weighted sum is represented as:

energy[i]=($A_{o,i}$×eng_last[i])+($A_{-1,i}$×energy[i−1])+($A_{+1,i}$×energy[i+1]), The array eng_last[] is the array of the previous frame's energies. The constants $A_{o,i}$, $A_{-1,i}$, and $A_{+1,i}$ can be chosen to minimize the mean-square error (MSE) between the regenerated value and the actual transmitted one. Any standard MSE estimation technique can be used to generate these constants. The coefficients $A_{-1,1}$ and $A_{+1,8}$ are set to zero because the corresponding energy[0] and energy[9] values are not defined.

After the regeneration operations are complete (step 617), the final values of the energy[] array are copied into the eng_last[] array for use in subsequent frames (step 619).

The protection algorithm has been tested with a variety of fading and random pattern channel simulations. At 5% random channel BER, the output BER from the first stage of the decoding algorithm was predicted to be 0.725%. At 10% random channel BER, the output BER was predicted to be 2.8%. Observed values very closely matched these predicted values.

A design goal of the algorithm is to minimize full-frame replacement during low-BER random pattern errors. Full-frame replacement is intended for repairing an entire frame that was completely corrupted by a fade error. Replacement of all the energy values in a frame only adds artifacts when it occurs during low-BER random errors. Simulation results have revealed that only 1.2% of the frames are fully replaced during 5% random pattern BER operation. This is a factor of 50 improvement over the 64% expected replacement rate for a single checksum system under the same conditions.

The algorithm was fully tested in fading error patterns. Simulation results were generated for the following combinations of vehicle speed and carrier frequency: 10 mph/150 MHz, 30 mph/450 MHz, and 60 mph/800 MHz. The average bit error rate for the tests was 10%. In all three cases, the algorithm eliminated 99% or more of the perceptually objectionable artifacts in the output speech.

The invention has been described in connection with what is presently considered to be the most practical and preferred embodiment. The invention is not limited to the disclosed embodiment, but is intended to cover various modifications and equivalent arrangements included within the spirit and scope of the appended claims.

What is claimed is:

1. A method for error detection and correction of a signal communicated from a transmitter to a receiver using sub-band coding, said method comprising the steps of:
   a. calculating individual energy values for input sub-band signal samples in the transmitter;
   b. generating protected bit sequences for individual energy values in the transmitter;
   c. transmitting from the transmitter and receiving at the receiver the protected bit sequences;
   d. detecting bit errors in each received protected bit sequence at the receiver; and
   e. regenerating an individual energy value when a predetermined error condition is detected in the received protected bit sequence associated with the individual energy value.

2. A method as in claim 1 wherein in step (b) the bits are protected by repeating at least one of the most significant bits of each energy value at least three times.

3. A method as in claim 2 further comprising an error correction step (f) wherein bit errors detected in a received energy value are corrected by a majority vote of the at least three received repeated bits.

4. A method as in claim 1 wherein step (e) is performed by regenerating an energy value that represents a weighted sum dependent on an energy value of a corresponding energy band of a preceding frame of sub-band signal samples.

5. A method as in claim 1 wherein step (e) is performed by regenerating an energy value with an energy value that represents a weighted sum dependent on an energy value of an adjacent band in a current frame of sub-band signal samples.

6. A method as in claim 1 wherein step (e) is performed by regenerating an energy value with an energy value that represents a weighted sum dependent on an energy value of an adjacent band in a current frame of sub-band signal samples and on an energy value of a corresponding band in a preceding frame.

7. A method for error detection and correction of a signal communicated between a transmitter and a receiver using sub-band coding, said method comprising the steps of:
   a. generating energy bit sequences each representing an individual energy value for a band in an input sub-band signal sample in the transmitter;
   b. protecting each energy bit sequence by repeating at least one of the most significant bits in the sequence;
   c. transmitting from the transmitter and receiving at the receiver the protected bit sequences with sub-band coded signal samples;
   d. detecting bit errors in the repeating bits of each bit sequence in the receiver;
   e. correcting errors in the repeating bits by a majority vote of the repeated bits; and
   f. regenerating an individual energy value when a predetermined error condition is detected in a received bit sequence.

8. A method for error detection and correction as in claim 7 further comprising the step (g) of regenerating an energy value in a frame of sub-band coded signal samples when a second predetermined error condition is detected in the received energy bit sequences for the frame.

9. A method for error detection and correction as in claim 7 wherein in step (f) the predetermined error condition is that at least two of the received repeating bits differs from the corresponding received repeating bits.

10. A method for error detection and correction as in claim 7 wherein in step (f) the predetermined error condition exists if at least one of the received repeating bits differs from the corresponding received repeating bits and the received individual energy value exceeds an average energy value.

* * * * *